United States Patent [19]

Cunningham et al.

[11] Patent Number: 5,105,773

[45] Date of Patent: Apr. 21, 1992

[54] METHOD AND APPARATUS FOR ENHANCING COMBUSTION IN AN INTERNAL COMBUSTION ENGINE THROUGH ELECTROLYSIS

[75] Inventors: John E. Cunningham, Niagara Falls; Roland E. Goodenough, Rochester, both of N.Y.

[73] Assignee: Alternate Fuels, Inc., Niagara Falls, N.Y.

[21] Appl. No.: 779,886

[22] Filed: Oct. 21, 1991

[51] Int. Cl.$^5$ .............................................. F02B 43/10
[52] U.S. Cl. ...................................... 123/3; 123/1 A; 123/DIG. 12; 204/129
[58] Field of Search ................... 123/1 A, DIG. 12, 3; 204/272, 129

[56] References Cited

U.S. PATENT DOCUMENTS

| | | | |
|---|---|---|---|
| 4,023,545 | 5/1977 | Mosher et al. | 123/3 |
| 4,111,160 | 9/1978 | Taleati | 123/1 A |
| 4,113,601 | 9/1978 | Spirig | 204/272 |
| 4,271,793 | 6/1981 | Valdespino | 123/3 |
| 4,332,219 | 6/1982 | Gonzalez | 123/3 |
| 4,368,696 | 1/1983 | Reinhardt | 123/DIG. 12 |
| 4,369,737 | 1/1983 | Sanders et al. | 123/DIG. 12 |
| 4,379,043 | 4/1983 | Chappelle | 204/272 |
| 4,442,801 | 4/1984 | Glynn et al. | 123/DIG. 12 |
| 4,599,158 | 7/1986 | Ofenloch | 204/272 |
| 4,763,610 | 8/1988 | Thomas | 123/3 |

Primary Examiner—E. Rollins Cross
Assistant Examiner—Erick Solis
Attorney, Agent, or Firm—Sommer, Oliverio & Sommer

[57] ABSTRACT

The present invention 10 comprises a hollow main canister 11 having a series of anodes 25 and cathodes 29 interposed therein for the electrolysis of an electrolytic fluid F, such as potassium hydroxide. The electrolytic reaction is powered through the use of a current source 36 which positively charge the anodes immersed in the electrolytic fluid F. The produced ionized oxygen and hydrogen from the electrolytic reaction is directed through the canister through the combustion situs 45 of an internal combustion fuel/air mixture system through the use of a delivery tube 22. A flash arrestor 44 is used to ensure no flame or backfire migrates through the system and the level of fluid is optically monitored through the use of a liquid level sensor 46. The oxygen and hydrogen interposed within the combustion situs enhances combustion and the cleanliness of the same thereby producing a cleaner and more efficient burn of the hydrocarbon fuel.

9 Claims, 2 Drawing Sheets

_5,105,773_

METHOD AND APPARATUS FOR ENHANCING COMBUSTION IN AN INTERNAL COMBUSTION ENGINE THROUGH ELECTROLYSIS

TECHNICAL FIELD

The present invention relates generally to internal combustion engines and the use of electrolytically generated hydrogen and oxygen to enhance combustion efficiency and cleanliness and more particularly, to an electrolyser device designed for use in automobiles or other vehicles that produces the requisite amounts of hydrogen and oxygen through the variation of surface area and orientation of the electrolytic anodes and cathodes.

BACKGROUND OF THE INVENTION

A typical internal combustion engine such as that generally used in automobiles, trucks and other similar vehicles uses hydrocarbon fuels for combustion. It is well known that the burning of such fuels is not one hundred percent efficient and further, produces large amounts of pollutants as a byproduct of the combustion process. Accordingly, many attempts have been made to enhance the completeness of combustion by the introduction of various catalysts and additives, including gaseous hydrogen and oxygen into the burning process. Such attempts were made with the goal of improving combustion efficiency and cleanliness, while ensuring the stability of the combustion process and viability of engine components.

In particular, many attempts have been made in the prior art to use a basic electrolysis reaction of various solutions (water or other chemical compositions containing oxygen and hydrogen) to produce elemental oxygen and hydrogen in gaseous form. These gases, known to increase the efficiency of combustion within said certain ranges, are then typically introduced either singly or together into the combustion situs in hopes of achieving the goal of improved combustion efficiency and concomitant cleanliness. For example, U.S. Pat. No. 4,111,160 (Talenti) provides a broad overview of the prior art attempts and the use of the basic electrolysis reaction to achieve enhanced combustion.

As can be seen from the prior art, controlling the amount of hydrogen and oxygen produced during the course of electrolysis is a key consideration. In particular, numerous efforts have been made to provide storage tanks for excess elemental hydrogen and oxygen, to vent produced oxygen to the atmosphere while using primarily hydrogen to enhance combustion, providing pressure balancing systems (e.g., Talenti) to achieve a measured and verifiable electrolysis reaction, together with other safety means to avoid an uncontrolled combustion reaction or detrimental effects upon engine components.

The present invention solves these problems by employing a unique combination of anodes and cathodes in an easily adaptable environment within the fuel system; i.e., the air-fuel mixture system, to produce an electrolysis reaction and to enhance combustion without the need for storage tanks, pressure valves and the like in a safe and efficient manner. Accordingly, the present invention contemplates controlling the underlying electrolytic reaction by carefully varying the surface areas of the anodes and cathodes powering the reaction through the use of variable horizontal and vertical spacing of the same and by employing a unique mesh design for the anodes.

Accordingly, by carefully controlling the electrolytic reaction, the proper amount of hydrogen and oxygen to enhance combustion (i.e., safe combustion) is produced and delivered to the combustion site (e.g., a carburetor) without the need for storage tanks, pressure valves and the like. Nonetheless, the present invention includes a flash arrestor which automatically prevents any flame, backfire or other misfiring occurring in the carburetion or fuel injection area from migrating back through the system into the electrolyser and engine compartment area thereby avoiding any potential explosive or other dangerous condition. Too, it is contemplated that in lieu of a flash arrestor, the invention could include a pressure detection device wherein pressures in excess of a set limit occurring in the delivery tube or fuel/air mixture system would result in termination of the electrolysis process.

Thus, the present invention solves the problems of the prior art in a simple, straightforward and readily adaptable manner.

DISCLOSURE OF THE INVENTION

The present invention (e.g. 10) provides a device to be interposed within an internal combustion fuel system for generating through electrolysis gaseous hydrogen and oxygen capable of delivery to the combustion site to increase the efficiency and cleanliness of combustion. In particular, the preferred embodiment of the device includes a hollow canister (e.g. 11), having a top portion (e.g. 12) and a bottom portion (e.g. 13); a series of three cylindrical cathodes (e.g. 25), preferably of nickel, each having a variable diameter such that the cathodes may be spaceably arranged one within the other; a series of three stainless steel mesh anodes (e.g. 28) each of variable diameter and adapted to fit one within the other and further, within the spaces between the cathodes; a nonconductive mesh (e.g. 30) encasing the stainless steel mesh (e.g. 29) of each of the anodes and adapted to insulate the anode from inadvertently touching the cathodes; an epoxy coated anode connector post (e.g. 31) interposed within the bottom portion of the main canister and adapted to be connected, at one end, to each of the anodes and at the other end to a positive current source (e.g. 36); an epoxy coated cathode connector post (e.g. 38) interposed through the bottom of the main canister and adapted to be connected at one end to each of said cathodes and at the other end to a ground point (e.g.43); a delivery fitting (e.g. 16) interposed within the top portion of the main canister and adapted to form a passageway connecting the hollow inside of the main canister and the outside thereof; a delivery tube (e.g. 22) interposed at the outside end of the delivery fitting and adapted to carry fluid therethrough; an electrolytic fluid (e.g. F), such as potassium hydroxide, contained within the main canister and having a sufficient volume to cover the surface area of the anodes and cathodes, while leaving a air space (e.g. 5) at the top of the main canister; a flash arrestor (e.g. 44) interposed within the delivery tube for precluding migration of any flame or backfire occurring in the fuel-air system area (at the carburetor or injection area) through to the electrolysis device; and liquid level sensor (e.g. 46) interposed through the top surface of the main canister for optically determining the level of the electrolytic fluid within the canister.

In operation, the device produces gaseous hydrogen and oxygen through an electrolytic reaction. In particular, the positive current positively charges the anodes causing the typical electrolysis reaction of the potassium hydroxide or other electrolyte thereby freeing gaseous oxygen and hydrogen which, in turn, surfaces at the top portion of the main canister. The hydrogen and oxygen mixture is then delivered through the delivery fitting through the delivery tube to the combustion site of the fuel/air system and is ignited in the ordinary manner, e.g., by a spark plug, as the internal combustion engine functions to burn its normal hydrocarbon fuel. The amount of hydrogen and oxygen produced, critical to the efficiency and safety of the reaction, is controlled through a careful positioning of the anodes and cathodes; i.e., by varying the lateral spacing and relative vertical orientation of the anodes and cathodes as well as the surface area of the anodes through the use of mesh rather than a solid anode material. Accordingly, the amount of hydrogen and oxygen produced through the normal electrolysis reaction may be accurately determined by virtue of the orientation of the anodes and cathodes and thus, the amount of hydrogen and oxygen produced by the reaction may be controlled. Thus, there is no need for storage tanks, pressure control valves or other devices to monitor the reaction aside from the flash arrestor device or other control device used as a safety feature to override any electrolytic reaction that may, for whatever reason, be outside the bounds of normal operation of the engine at hand.

Thus, the primary object of the invention is to provide a controlled device for producing hydrogen and oxygen through electrolysis and delivering the same to the combustion site of an internal combustion engine.

Still another object of the invention is to produce hydrogen and oxygen through electrolysis that may be delivered to an internal combustion engine combustion site without the need for storage tanks, valves or the like.

Still another object of the invention is to provide controlled amounts of hydrogen and oxygen to the combustion site without the need for constant monitoring and through the use of a particularized structure of the electrolysis device.

These and other objects of the invention will become apparant from the foregoing and ongoing written specification, the drawing figures and claims that follow.

MODE(S) OF CARRYING OUT THE INVENTION

Figure 1:
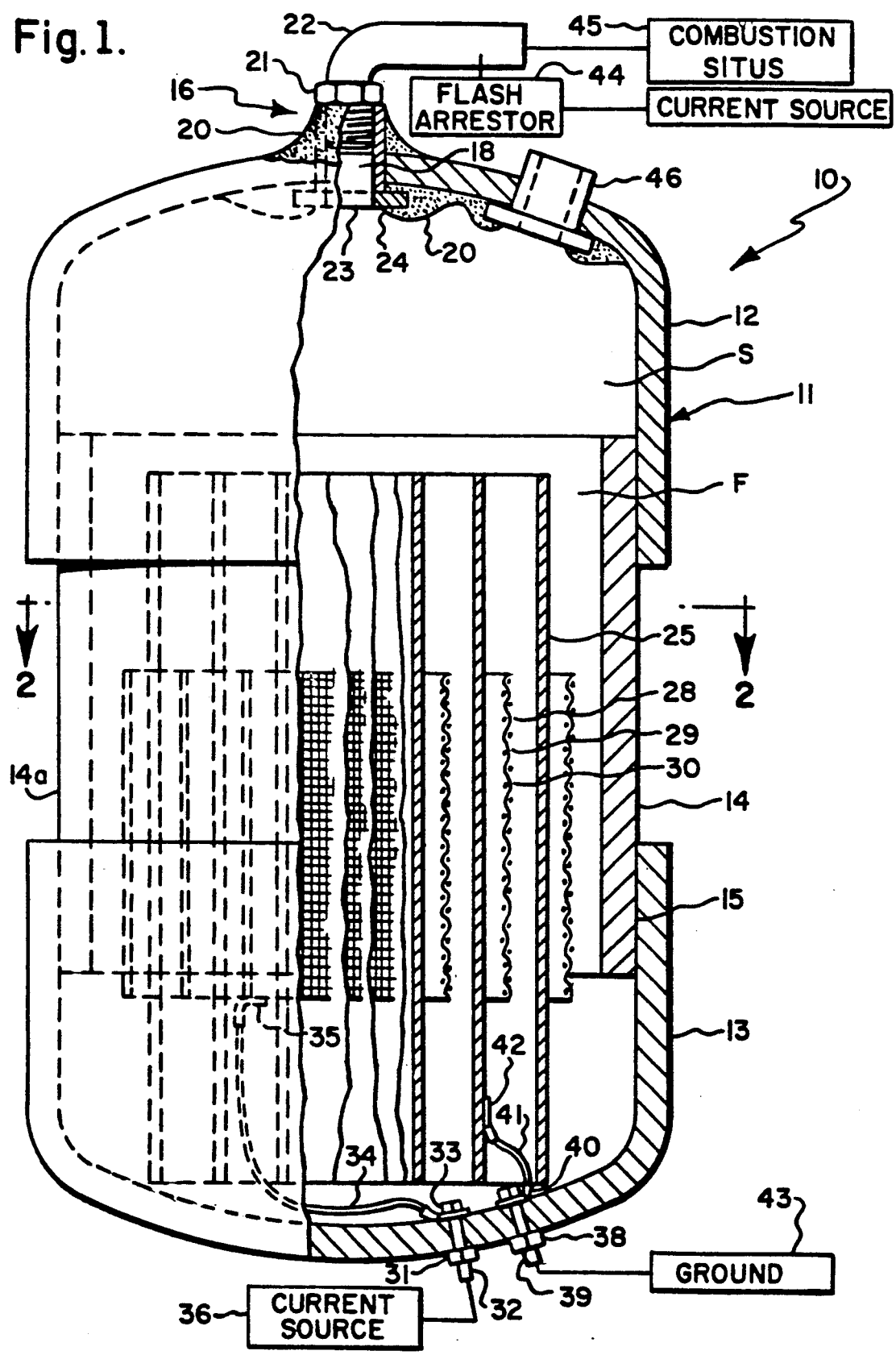
FIG. 1 is a fragmentary longitudinal sectional view of the preferred embodiment of the device showing the spacing and interposition of the anodes and cathodes.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting first to FIG. 1, the device 10 is shown to generally comprise a hollow main canister 11 generally comprised of a hollow inverted cup-shaped top portion 12, and cup-shaped bottom portion 13 joined on their inside portions by parallel vertical side members 14 and 14A. The main canister is normally fabricated from lightweight PVC material or a similar material to minimize weight while maintaining durability and sealing capability. In particular, the top and bottom portions are joined to the side portions of the main canister by overlapping the facing planar surfaces at, for example, 15. This further ensures the structural stability and sealing capability of the canister during operation of the device.

Continuing to advert to FIG. 1, a substantially cylindrical delivery fitting 16 is interposed through the wall of the top portion 12 at a point directly at the top thereof to form a circular passageway 18 therethrough. Passageway 18 is generally threaded on its inside portion to accept in sealing engagement a hollow screw plug 19 therein. Screw plug 19 ensures solid engagement and sealing of the passageway while permitting the flexible connection of delivery tube 22 at the outside end thereof. Connection of delivery tube 22 and screw plug 19 is facilitated through the use of a complementary top cap 21 adapted to engage the top of the hollow screw plug and form a joining connector between the top of the screw plug and the delivery tube 22. Additional sealing material 20, such as PVC cement or glue impervious to gas, heat or water is interposed around the screw cap to further ensure sealing engagement and the integrity of the delivery fitting and passageway.

Continuing to advert to FIG. 1, that portion of the delivery fitting extending into the hollow portion of the main canister terminates by engaging a connector and seal assembly 24 adapted to be affixed to the end of the delivery fitting and passageway to seal the inside portion thereof and further ending in an opening 23. PVC cement or glue is also interposed on the inside of top portion 12 to seal the delivery fitting and passageway within the main canister hollow.

Delivery tube 22 extends to the combustion situs 45 of the internal combustion engine and fuel/air mixture system into which the device is incorporated. For example, the combustion situs 45 may be, in a normal internal combustion engine, the air cleaner and carburetor assembly on the top of the engine or similarly, in a fuel injection system, in the air induction or air cleaner area.

Figure 2:
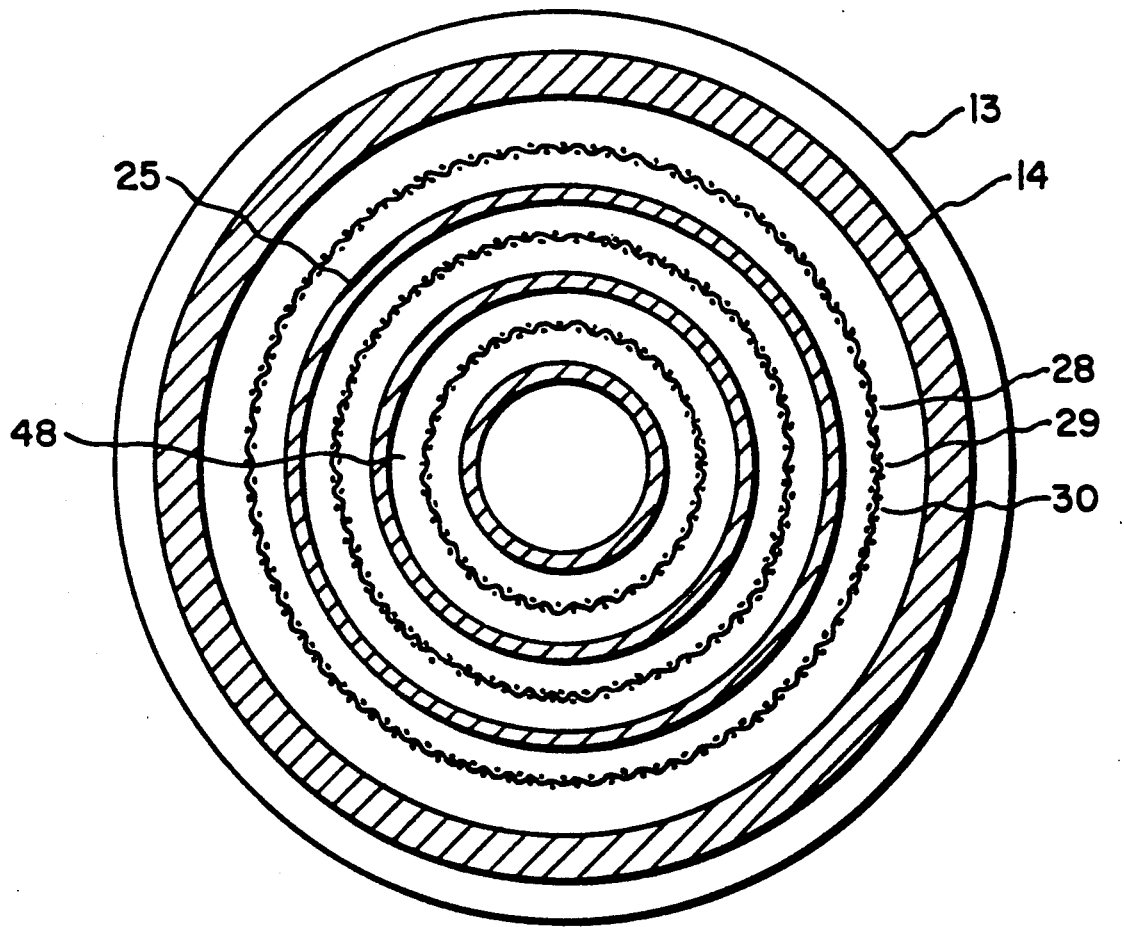
FIG. 2 is a horizontal sectional view of the device along 2—2 of FIG. 1.

Adverting to FIGS. 1 and 2, the anode and cathode structure of the device is shown. In particular, the device includes a series of three cylindrical, thin-walled cathodes 25 usually comprised of nickel and having varying diameters such that each of the three cathode cylinders may be placed one within the other. The cathodes are arranged and dimensioned in such a manner that a space, e.g., 48, is formed therebetween when the cathodes are arranged one within another. This space 48, of course, can be varied by varying the diameter of each of the cathodes as desired. Continuing to advert to FIG. 1 and 2, the cathodes are shown to be arranged at the identical vertical height; however, in practice, the height of the cathodes may be varied with respect to one another by an appropriate mounting means or suspension in the main canister hollow.

Continuing to advert to FIGS. 1 and 2, the device is shown to further include a series of three anodes, 28, of cylindrical shape. Anodes 28 are comprised of two portions, namely, a stainless steel mesh at preselected hole dimension formed into a cylinder of a preselected vertical height. The stainless steel mesh cylinder is further encased by a non-conductive (e.g., plastic or PVC) mesh acting as a barrier or insulator for the underlying stainless steel mesh of the anode. The diameter dimension of the anode is selected such that each may be arranged one within another and within the spaces 48 between the cathodes. Accordingly, as shown in FIG. 2, the inner portion of the device comprises a series of six cylinders one within another alternating between cathodes and anodes and having preselected spaces therebetween without touching or contact. Too, the anodes may be positioned vertically at various points with respect to one another and with respect to the cathode, as desired in the context of the electrolysis reaction discussed below. Similarly, the spacing between the anodes and cathodes may also be varied by varying the diameters of both the anodes and cathodes in the desired fashion.

Although the anodes and cathodes are described to be nickel in the preferred embodiment, other materials such as platinum coated nickel may be employed provided the reaction may be controlled in the manner described. The materials comprising the anodes and cathodes are chosen not only for the reactive properties, but also with respect to their longevity, deterioration and overall electrolysis activity. These factors need to be balanced to achieve a desirable material combination which, as in the preferred embodiment, has a useful life of three years or more in the presence of potassium hydroxide or other similar electrolytes.

Adverting to FIG. 1, epoxy coated anode connector post 31 is interposed through the wall of bottom portion 13. Epoxy coated anode connector 31 terminates at either end with a connecting point and screw 32 and 33 adapted to receive a connecting wire 34. Epoxy coated anode connector post 31, at its outside portion is connected to current source 36 which may be, in the case of an automobile, the automobile battery or an appropriate point in the fuse box of the vehicle. The current source is able to travel through the epoxy coated anode connector post 31 and appended connector 33 through anode wire 34 which is connected at its other end to each of the anodes at a point, e.g., 35. Although not specifically shown in FIG. 1, each of the anodes is connected to the epoxy coated anode connector post and ultimately the current source in an identical manner.

Still considering FIG. 1, epoxy coated cathode connector post 38 is similarly interposed through the wall of bottom portion 13 and terminates at either of its ends with wire connectors 38 and 40. In particular, connector 40, on the inside portion of the epoxy coated cathode connector post is adapted to engage cathode wire 41 which, in turn, engages each of the cathodes at a point 42, as shown in FIG. 1. Each of the cathodes is connected to the cathode post through a similar wire arrangement as is shown in FIG. 1. At its outside portion, cathode electrical connector 39 is connected to a ground point, 43, somewhere in the automobile.

Accordingly, when fully interposed within the fuel system, each of the anodes is capable of being supplied with a positive current source 36 through use of the epoxy coated anode connector post and internal wiring such that each of the anodes may be positively charged during the course of operation. Similarly, each of the cathodes is externally grounded through the use of an identical wiring arrangement terminating in a ground point outside the device somewhere on the automobile or vehicle incorporating the device in the internal combustion and fuel system.

An electrolytic fluid F is interposed within the hollow of the main canister in a sufficient volume to cover all or the majority of the anode and cathode surfaces. Typically, the electrolytic fluid is potassium hydroxide or a similar compound able to generate free oxygen and hydrogen ions as a result of an electrolytic reaction. The volume of fluid F will generally not entirely fill the hollow canister and a space S, will typically be left at the top portion thereof.

Completing the components of the device is the interposition of a flash arrestor 44 within the delivery tube 22. The flash arrestor is adapted to detect any flame, backfire or other misfiring disturbance occurring at the fuel/air mixture point and prevents the migration of any flame or other potentially hazardous liquid or gas through the system into the electrolysis reaction area. Although a flash arrestor is shown in the preferred embodiment, a pressure detection device may also be employed which detects increases in pressures beyond a pre-set limit in the delivery system. If this condition is sensed, the pressure sensor may be operatively connected to the electrolysis canister or current source to effect immediately termination. The preferred embodiment operates at a maximum pressure of approximately one-half PSI and further, comprises an "open-ended discharge" system thereby reducing volatility. Accordingly, pressures in excess of the one-half PSI or any other suitable range could be easily detected by a simple pressure detection device.

The device further includes a fluid level sensor 46 such as an optical liquid level sensor or other type device by which the level of fluid F within the canister hollow may be detected optically by looking through the sensor. These types of sensors are typically seen in maintenance-free auto batteries wherein it is not necessary to uncap the battery to determine the level of liquid or fluid therein. Fluid level sensor 46 is sealingly interposed through the wall of top portion 12 by either threading or the use of an appropriate sealing media such as PVC cement, glue or the like.

In operation, the device is interposed within the engine compartment of an internal combustion engine and is arranged to communicate with the combustion situs 45 such as the carburetor and air cleaner components or fuel injection area. The device is also connected to a power source, e.g., the battery or fuse box, in order that a small amount of positive current may be provided through the device. The device is also typically grounded at a ground point 43 on the automobile frame or engine compartment.

In a normal electrolysis reaction, a current is supplied to the anodes which, in consort with the cathodes and electrolytic fluid F (potassium hydroxide in the preferred embodiment) produces a chemical reaction resulting in the production of free oxygen and hydrogen ions which migrate to the top portion of the hollow main canister. The gaseous hydrogen and oxygen is directed through the opening tube 23 and delivery fitting 16 through delivery tube 22 to the combustion situs 45. Flash arrestor 44 ensures that the reaction has not produced a flame or backfire and is well within safe limits. The hydrogen and oxygen is merged in the usual combustion situs of the engine and serves to enhance burning of the typical hydrocarbon fuels thereby improving the efficiency of the burn and the cleanliness of the same.

The normal electrolysis reaction will produce approximately 66 percent hydrogen and 33 percent oxygen. The percent of hydrogen and oxygen, however, can be varied by varying the surface area and spacing (vertically and laterally) of the cathodes and anodes. In particular, more hydrogen can be produced by decreasing the surface area of the anodes. This is accomplished in the present invention through the use of stainless steel mesh, as opposed to a solid surface and by selectively spacing the distance between the anodes and cathodes according to the desired reaction required. Accordingly, once the proper dimensions are configured for the device, the requisite amount of hydrogen and oxygen can be accurately predicted within safe limits. The present invention produces approximately 85 percent hydrogen and 15 percent oxygen at a constant level of approximately 2-4 amps. Accordingly, it is not required to have storage tanks, pressure valves or monitoring devices, aside from the general safety flash arrestor or sensor, to operate the device. Too, the open ended discharge characteristics of the system reduce volatility substantially. The measurements, of course, will depend upon engine size and requirements and can be easily calculated and determined through experimentation. Thus, by merely varying the space and vertical orientation of the anodes and cathodes and the surface area thereof, it is possible to produce the desired amount of hydrogen and oxygen through simple electrolysis of potassium hydroxide and deliver the same to the combustion situs of the internal combustion engine. For example, in the preferred embodiment of the invention, the stainless steel mesh has a screen size of $\frac{1}{8}$" and the anodes and cathodes are positioned $\frac{1}{4}$" apart.

Further, the invention will operate with the small amount of current (e.g. 2-4 amps) produced through the auto battery or fuse box and does not require a secondary power source. This, too, enables the device to be as unobtrusive as possible in the engine compartment and does not require the addition of weight or bulk to the automobile or vehicle at hand. Moreover, the device is readily adaptable for use with carbureted engines or fuel injection devices and also, with diesel engines.

Finally, the use of the optical liquid level sensor permits easy maintenance of the device and allows the electrolytic fluid F, to be refilled at appropriate intervals to maintain the reaction desired.

MODIFICATIONS TO THE INVENTION

Although a single embodiment of the invention is disclosed, it is clear from the specification, drawings and description of the invention that many modifications and changes may be made without departing from the invention.

For instance, although potassium hydroxide is used as the electrolytic fluid, other fluids of similar characteristics could be used. Moreover, the number of anodes and cathodes may be readily varied to produce an appropriate reaction for the vehicle at hand.

Too, mesh screens of variable dimension and orientation, together with appropriate cathode cylinders of various materials may be employed depending upon the reaction required.

These and other modifications and changes to the invention would be readily apparent to one of skill in the art and anticipated by the specification and description of the invention, as well as the following claims.

We claim:

1. An electrolyser device for use in an internal combustion engine fuel/air mixture system for enhancing combustion, comprising:
    a main canister, interposed within said internal combustion fuel/air mixture system, said canister having a top portion and a bottom portion and side portions forming a hollow cavity and adapted to sealably contain a fluid therein;
    a delivery fitting interposed on the top surface of said main canister and forming a communicating passageway between said inside hollow of said canister and the outside of said canister;
    a delivery tube flexibly attached to said outside portion of said delivery fitting and adapted to carry fluids therethrough;
    a plurality of cathodes interposed within said inside of said main canister and fixably supported thereby, said cathodes each further comprising a hollow cylinder each of preselected different diameter such that each of said cathode cylinders is adapted to be spaceably arranged one within the other;
    a plurality of anodes interposed within said hollow inside of said main canister and fixably supported thereby, each of said anodes further comprising a hollow stainless steel mesh cylinder each of preselected different diameters such that each of said anodes is adapted to be arranged one within the other and within said spaces between said cathodes, said anodes further comprising a covering non-conductive mesh encasing said stainless steel mesh;
    a cathode electrical connector post interposed through said bottom of said main canister and adapted at either end to be engaged by an electrical connector means, said cathode electrical connector arranged at one end to be connected to each of said cathodes and at the other end thereof to a ground point;
    an anode electrical connector post interposed through said bottom of said main canister and adapted at either end to be engaged by an electrical connector means, said anode connector engaged at one end to each of said anodes and at the other end to a source of positive electrical current such that upon application of said current, said anode becomes positively charged;
    an electrolytic fluid, containing hydrogen and oxygen, interposed within said main canister such that the surface area of said anodes and said cathodes are covered thereby;
    whereby upon application of the positive electric current to the anodes, electrolysis reaction occurs freeing gaseous oxygen and hydrogen through said delivery valve and delivery tube dependent upon said orientation of said anodes and cathodes.

2. The device according to claim 1 wherein said electrolytic fluid is potassium hydroxide.

3. The device according to claim 1 further comprising a liquid level sensor interposed through the top of said main canister for optically determining the level of said electrolytic fluid in said canister hollow inside portion.

4. The device according to claim 1 and further comprising a flash arrestor interposed within said delivery tube, and adapted to automatically preclude migration of any flame or backfire from said fuel-air mixture system to said main canister.

5. The device according to claim 1 wherein said anodes are stainless steel and said cathodes are nickel.

6. In an internal combustion engine fuel system having a combustion site, such as a carburetor, the method of providing gaseous oxygen and hydrogen through electrolysis to enhance combustion, comprising the steps of:
providing a hollow main canister within said fuel system adapted to sealably contain a fluid;
providing a plurality of cylindrical cathodes of varying diameter such that each of said cathodes may be arranged one within the other and such that there is a space therebetween;
providing a plurality of conductive mesh cylindrical anodes of varying diameter such that each of said anodes may be arranged within the other and within said spaces between said cathodes;
providing a non-conductive mesh encasing said anodes;
providing a positive current to each of said anodes whereby said anodes may be selectively electrically positively charged;
providing a ground to each of said cathodes;
providing a volume of electrolytic fluid within said main canister, said provided fluid volume sufficient to cover the surface areas of each of said anodes and cathodes;
providing a delivery fitting at the top of said main canister such that there is a communicating passageway between said canister hollow inside and outside;
providing a delivery tube flexibly attached to said delivery valve and adapted to carry a fluid there through;
varying said spaces between said anodes and cathodes, said surface areas of said anodes and cathodes and said vertical orientation of said anodes and cathodes such that upon application of said positive current, electrolysis of said electrolytic fluid occurs such that a desired amount of oxygen and hydrogen are produced;
venting said produced oxygen and hydrogen gas through said delivery fitting and delivery tube to said combustion site of said internal combustion engine and fuel/air mixture system;
whereby the introduction of gaseous hydrogen and oxygen into the combustion process enhances the completeness and cleanliness of the same.

7. The method according to claim 6 wherein said electrolytic fluid is potassium hydroxide.

8. The method according to claim 6 further comprising the step of providing a liquid level sensor interposed on the top of said main canister such that said volume of said electrolytic fluid may be optically determined.

9. The method according to claim 6 further comprising the step of providing a flash arrestor within said delivery tube such that upon detection of a flame or backfire, migration to said hollow canister is precluded.

* * * * *